Patented Jan. 21, 1941

2,229,579

UNITED STATES PATENT OFFICE 2,229,579

AIR BAG TREATMENT

Frank H. Manchester, Akron, Ohio, assignor to Wingfoot Corporation, Wilmington, Del., a corporation of Delaware No Drawing. Application August 1, 1936, Serial No. 93,886

6 Claims. (Cl. 18—45)

This invention relates to improvements in the vulcanization of rubber and concerns particularly cores or bags inserted within hollow articles such as pneumatic tires for molding and curing purposes, and particularly those bags which are made of rubber and filled with air, or a gas or fluid such as steam or water which may be heated.

In the vulcanization of pneumatic tires and the like such cores or curing bags have been found to deteriorate during use particularly on their inner surfaces. Where air is used the deterioration seems to be caused principally by heat and oxidation. Various compositions have been used heretofore to protect the surfaces of such bags when used for curing tires and other articles with air under pressure in the curing bag. Illustrative are the glycerine compositions disclosed in U. S. Patents Nos. 1,755,069 and 1,694,879.

Where steam or water is the inflating medium employed in the curing bag, glycerine compositions have not been satisfactory because of the fact that they distill off with the steam or are otherwise carried away by the steam or the water. Without a protectant the interior of the bag corrodes or oxidizes or erodes so that pieces of the interior portion of the bag break off in segments of the nature of coffee grounds. The bag fails by becoming progressively thinner as the oxidation or erosion process goes on.

It is, accordingly, an object of this invention to provide a composition which when injected or otherwise inserted into a curing bag will preserve the inner surfaces thereof against the action of steam, carbon dioxide, air, hot water, and other deteriorating influences or combinations of these fluids. Another object is to provide an improved curing bag. Other objects will become apparent as the description of the invention proceeds.

The invention involves the discovery that compositions comprising high molecular polymers of purely aliphatic mono olefins having branched carbon chains, more particularly of isobutylene, are excellent agents for preventing the deterioration of air bags due to the harmful action of the inflating mediums employed.

The polymers used according to this invention are materials having a very high molecular weight, usually of at least about 1000 and ranging up to a value in the neighborhood of 10,000 and even much higher, depending on the manner in which they are prepared. Such polymers may be obtained by polymerizing unsaturated hydrocarbons such as isobutylene. Polymerization may be carried out at temperatures below zero °C. and preferably not exceeding 10° below zero °C. and especially at between 40° to 80° below zero °C. with a catalyst of the Friedel-Crafts type such as boron fluoride, although aluminum chloride, titanium tetra chloride, and the like may also be used in many cases. The molecular weight of the polymer is, generally speaking, controlled by the purity of the unsaturated hydrocarbon, the catalyst and the temperature of polymerization. The higher polymers are obtained at very low temperatures and with very pure olefins.

These polymers are characterized by a high viscosity over a wide range of temperatures. They also have good adhesive properties and are highly resistant to oxidation. Thus, they will adhere to the inner surface of the curing bag and will retain a sufficiently high viscosity at temperatures up to about 125° C. to prevent flowing to such an extent that the inner surface of the bag is exposed.

These polymers without any additive material may be introduced into the curing bag during its manufacture and before it is spliced, or they may be dissolved with a solvent such as carbon tetra chloride or a water emulsion can be made using casein as a protective colloid, and the solution or emulsion added to the air bag inner surface. These solutions or emulsions of the polymer may then be painted on the inner surface of the curing bag or, if sufficiently dilute, they may be injected through the curing bag valve stem.

Satisfactory results are obtained by this procedure but very much more satisfactory results are obtained by using a mixture of polymerized isobutylene with a relatively non-oxidizable plasticizing material which is compatible with the polymerized isobutylene. Illustrative of such non-oxidizable materials are paraffin, rosin, beeswax, carnauba wax, Halowax (chlorinated naphthalenes), cumar and Arochlors (halogenated diphenyls). Of these non-oxidizable materials, paraffin is preferred. Paraffin and these other waxy or resinous materials, besides acting as a plasticizer for the polymerized isobutylene, have the property of preserving the inner surfaces of air bags by themselves and also aid in keeping the air bag flexible and pliable. However, by themselves they will not adhere to the bag surface. Also, most of them are absorbed by the rubber to some extent.

The polymerized isobutylene besides being a preserving agent itself will adhere to the rubber surface and will also inhibit the absorption of the waxy material by the rubber. The non-oxidizable waxy or resinous material renders the polymerized isobutylene more plastic and more readily applicable to the curing bag. Thus, a mixture of polymerized isobutylene and a non-oxidizable waxy or resinous material heated to about 100° C. can be easily injected into the curing bag through the valve stem, no solvents or other thinners being necessary.

The polymerized isobutylene applicable for use in the practice of the invention may vary in consistency from that of glucose to that of ordinary coagulated unvulcanized rubber. That material is preferred, however, which is sold under the trade name Vispronal #6 by the Advance Solvents & Chemical Corporation of New York city. This Vispronal #6 has a viscosity of 3 minutes and 40 seconds when determined by the following method. A sample of the polymerized isobutylene contained in a cylinder with an inside diameter of 4 centimeters was heated overnight at a temperature of 135–140° C. to remove air bubbles. The depth of the liquid in the cylinder was 13½ centimeters. A steel ball weighing 16.27 grams with a diameter of 1.586 centimeters was then placed on the surface of the liquid and the time required for it to fall to the bottom of the cylinder was measured. For the polymerized isobutylene known as Vispronal #6 this requires 3 minutes and 40 seconds. While a polymerized isobutylene having a viscosity of this order is preferred, it will be understood that both less viscous and more viscous polymerized isobutylene may be employed. Thus, a polymerized isobutylene believed to have a molecular weight of about 7000 and having a viscosity of 6 seconds, as determined by the above test, has been found satisfactory as have also polymerized isobutylenes of intermediate viscosities, for example, of 40–60 seconds, and polymerized isobutylenes having higher viscosities than Vispronal #6. The lower polymers, however, tend to distill out or break down under heating, while the higher polymers are more difficult to apply to the air bag inner surface.

In the preferred form of the invention, however, which comprises the use of the polymerized isobutylene with a non-oxidizable waxy or resinous material, preferably paraffin, the polymerized isobutylene known as Vispronal #6 has been found very desirable. When Vispronal #6 is used the proportions of it and the waxy material may be varied within wide limits. Thus, from 10 to 90 parts by weight of Vispronal #6 and 90 to 10 parts by weight of, for example, paraffin may be employed in the practice of the invention. A more desirable range of proportions, however, is from 30 to 70 parts by weight of Vispronal #6 and from 70 to 30 parts by weight of paraffin. The most preferred, however, are the compositions which contain from 50 to 60% Vispronal #6 and 50 to 40% paraffin. It will be understood, of course, that these proportions depend upon the consistencies of the polymerized isobutylene and of the relatively non-oxidizable waxy or resinous plasticizing materials and the best proportions of these materials to employ in any case will be determined by actual test.

The compositions consisting of polymerized isobutylene and paraffin, or other relatively non-oxidizable waxy or resinous material, may be conveniently prepared by melting the polymerized isobutylene and then mixing in the paraffin. It is also possible to first melt the paraffin and then add the polymerized isobutylene thereto. Also, a mixture of the polymerized isobutylene and paraffin may be heated together until a homogeneous composition is obtained. Generally, as steam pressure of 25 pounds per square inch for a period of one hour is quite sufficient for the preparation of these compositions.

Further illustrating the invention, a group of 6.00 x 16 curing bags were run in a curing cycle in which the inflating medium was steam under a pressure of 155 pounds per square inch for a predetermined period, followed by air under a pressure of 200 pounds per square inch. Some of the curing bags were each treated with an injection of about .7 pound of a composition consisting of 70 parts by weight of Vispronal #6 and 30 parts by weight of paraffin, the paraffin used melting at a temperature of about 50–60° C. These treated bags were run in a curing cycle along with a similar number of curing bags containing no treatment. After 250 heats (this means after the bag had been used for curing 250 tires) those curing bags with no treatment were reduced in volume of rubber about 75% by the corrosive and erosive action of the steam and air and their cross-sections were so thin that they had to be replaced by new bags. Those with the composition of polymerized isobutylene and paraffin ran 420 heats with no noticeable loss in thickness of the bag. Similar and even better results are obtained with a composition consisting by weight of from 50 to 60% Vispronal #6 and 50 to 40% of paraffin. Also, by adding about $\tfrac{1}{10}$ pound of the composition of polymerized isobutylene and paraffin about every 40 heats still more greatly improved results are obtained. In fact, by this invention the inner surfaces of the curing bag are so protected that when the bag fails, the failure is practically always from some other cause than the wearing away or oxidation on the inner surface. When it is considered that heretofore this wearing away and oxidation of the inner surface have nearly always been the primary cause of failure of curing bags, it will be apparent that an invention of real merit is provided.

Illustrating the use of polymerized isobutylene containing no non-oxidizable waxy or resinous material, a number of curing bags containing no preservative and a similar number containing on their inner surfaces a coating of Vispronal #6 were run in a regular curing cycle in which the inflating medium employed in the bags was a combination of steam and air. The polymerized isobutylene was applied to the inner surfaces of the bags by inserting it into the bags before they were spliced. It was then distributed about their inner surfaces by rolling the bags between pressure rollers prior to the vulcanizing of the bags. These treated curing bags ran about twice as long before failure as did the untreated bags.

It will be apparent from the foregoing description that an excellent preserving agent for the surfaces of heated rubber, particularly of curing bags, has been provided. Furthermore, it will be obvious to those skilled in the art that various minor modifications may be made in the invention without departing from the spirit of the invention or from the scope of the appended claims.

What I claim is:

1. A method of preserving curing bags which comprises injecting thereinto a composition comprising polymerized isobutylene.

2. A method of preserving curing bags which comprises injecting thereinto a composition consisting of approximately equal parts by weight of polymerized isobutylene and paraffin.

3. In the process of vulcanizing rubber articles wherein there is employed a rubber former which is distended during the vulcanizing step by means of a combination of steam and an inert gas, the improvement which comprises interiorly supporting the rubber articles during vulcanization by means of an expansible rubber former the inner surface of which is coated with a composition comprising polymerized isobutylene.

4. In the process of vulcanizing rubber articles wherein there is employed a rubber former which is distended during the vulcanizing step by means of a combination of steam and an inert gas, the improvement which comprises interiorly supporting the rubber articles during vulcanization by means of an expansible rubber former the inner surface of which is coated with a composition consisting of polymerized isobutylene and paraffin.

5. A method of preserving curing bags which comprises treating the same with a composition containing polymerized isobutylene and a waxy material.

6. A method of preserving curing bags which comprises treating the same with a composition comprising polymerized isobutylene and paraffin.

FRANK H. MANCHESTER.